Jan. 20, 1948.  A. G. PINCUS  2,434,674
FUSED UNITARY VITREOUS COMPOSITION FOR USE AS A DETERGENT,
WATER TREATING AGENT AND DEFLOCCULANT
Filed May 11, 1943
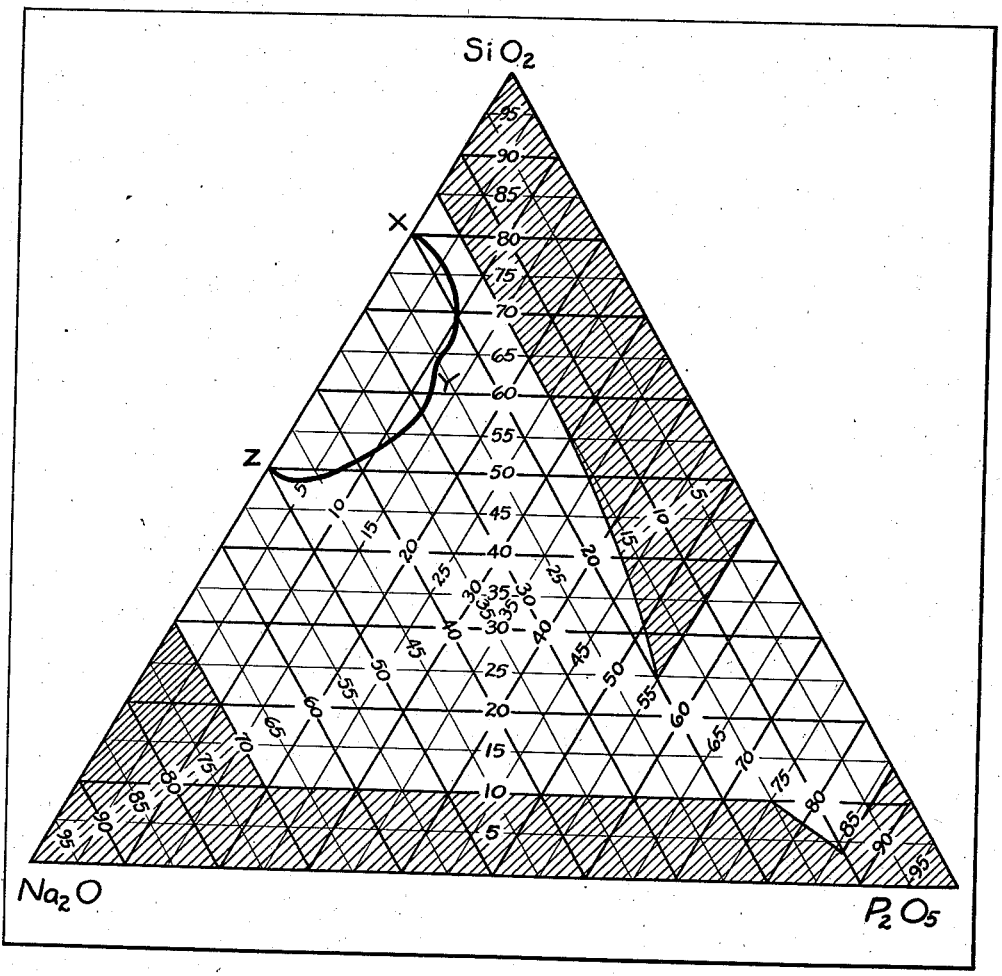
INVENTOR.
ALEXIS G. PINCUS
BY
ATTORNEY Patented Jan. 20, 1948

2,434,674

UNITED STATES PATENT OFFICE 2,434,674

FUSED UNITARY VITREOUS COMPOSITION FOR USE AS A DETERGENT, WATER TREATING AGENT, AND DEFLOCCULANT

Alexis G. Pincus, Southbridge, Mass., assignor to American Optical Company, Southbridge, Mass., a voluntary association of Massachusetts Application May 11, 1943, Serial No. 486,539

12 Claims. (Cl. 252—140)

This invention relates to improved chemical compositions particularly adaptable for cleansing and other purposes and which, at the same time, possess characteristics for water treatment and controlling its hydrogen ion concentration, and process of making the same.

This application is a continuation in part of my copending application, Serial No. 303,849, filed November 10, 1939, now abandoned.

One of the principal objects of the invention is to provide an improved chemical composition and process of making the same which has a wide range of uses and which is particularly adaptable for cleansing and other purposes and which, at the same time, possesses characteristics for removing hardness from water and controlling its hydrogen ion concentration and which is relatively inexpensive and economical to manufacture.

Another object is to provide an economical homogeneous composition formed from silica, alkali metal oxide and phosphorous pentoxide wherein the pentoxide may be included in the original batch of alkali and sand before melting and process of making the same.

Another object is to provide a composition of the above character controlled as to its rate of solubility and which is particularly adaptable for use as a detergent and process of making the same.

Another object is to provide a silica, alkali metal oxide and phosphorous pentoxide composition and process of making the same having characteristics particularly adaptable for use as abrasive scouring powders and whose abrasive characteristics may be varied according to the particular intended use of the composition.

Another object is to provide a composition of the above character having its various ingredients so controlled as to render said composition particularly adaptable for use as water treatment means particularly when it is desirable to control corrosion of metals, such as used in water lines, tanks, boilers, heating units, condensing coils and the like, and which will prevent the formation of scale by precipitation of calcium and magnesium compounds.

Another object is to provide a composition of the above character controlled as to its ability to flocculate and deflocculate solid materials and which is particularly adaptable to several uses such as oilwell drilling muds, purification of clay and flotation of minerals and the like.

Another object is to so control the method of forming compositions of the character described whereby the resultant composition may be in the form of a block or in a finely powdered state.

Another object is to provide a composition of the above character with which other desirable ingredients, such as soaps, wetting agents, alkali salts or the like may be mixed for particular desirable uses.

Other objects and advantages of the invention will become apparent from the following description taken in connection with the accompanying drawings and it will be apparent that many changes may be made in the compositions and methods set forth herein without departing from the spirit of the invention as expressed in the accompanying claims. I, therefore, do not wish to be limited to the exact compositions and methods disclosed as the preferred forms only have been given by way of illustration.

In the figure of the drawings there is illustrated a chart setting forth the proportions of the ultimate constituents in percentages by weight which come within the scope of this invention.

The basic composition of the invention comprises the product of the fusion of $SiO_2$, $P_2O_5$ and $Na_2O$. It has been found that by proper variation of these major ingredients several desirable compositions for given particular uses may be obtained.

In addition to the proper combination of constituents, it has been found that by careful controlling of the initial rate of cooling as well as subsequent heat treatments end products for different given uses may be obtained.

It has also been found that in addition to the above, the said end product may be combined with other desirable ingredients such as soaps, wetting agents, alkali salts, etc. which will render the resultant compound desirable for particular intended uses.

Some of the desirable uses to which the basic composition may be applied are as follows:

1. A detergent
2. A unitary abrasive and detergent composition
3. A water treating agent including removal of hardness, control of hydrogen ion concentration, protection of metals against corrosion by the water and prevention of scale deposition.
4. Deflocculating agent.

Sodium silicate "water glass compositions" have found wide applications as cleaning agents and for many other uses. Sodium phosphate glasses have more recently come into use because of their extraordinary effect of removing hardness from water without precipitation of insoluble calcium and magnesium salts. Although such ingredients have proven satisfactory for the above purposes individually, up to the present invention it has been necessary to prepare them separately and then form artificial synthetic mixtures of the two in order to obtain the desirable properties of each in a unitary product. It, therefore, has been necessary in the past to obtain separate ingredients and to form a synthetic mixture of said ingredients. This involved an additional process and care also had to be taken in order to obtain and maintain the desired proportion of said ingredients during said mixing. This procedure was also quite costly and inconvenient.

It, therefore, is one of the primary objects of this invention to overcome the above difficulties through the fusion of silica, sodium oxide and phosphorous pentoxide into a unitary homogeneous liquid and by the method of cooling and subsequent heat treatment retain it either in a vitreous unitary homogeneous composition or in the form of crystals homogeneously dispersed throughout a glassy matrix. Such homogeneous products of fusion produce much more effective and efficient products which can be manufactured at less cost than the previous mechanical mixtures.

Referring more particularly to the drawing the invention comprises broadly mixing sand as a source of silica ($SiO_2$), soda ash or the like as a source of sodium oxide ($Na_2O$) and phosphoric acid or some other source of phosphorous pentoxide ($P_2O_5$) in different given proportions indicated in given field designations.

It has been found that desirable compositions for use as detergents may be formed as follows:

|  | Parts by weight |
|---|---|
| $SiO_2$ | from 10 to 80 |
| $P_2O_5$ | from 1 to 85 |
| $Na_2O$ | from 20 to 70 |

The above gives the substantially maximum limits of variations of the various major ingredients of the composition.

Very desirable detergents have been obtained as follows:

|  | Parts by weight |
|---|---|
| $SiO_2$ | from 15 to 70 |
| $P_2O_5$ | from 5 to 35 |
| $Na_2O$ | from 25 to 55 |

In the above composition, through the reduction of the $P_2O_5$ content, detergents of less expensive nature may be obtained and less difficulty is encountered in melting the composition into a homogeneous glassy structure. With such proportions lower temperatures may be used in melting.

Detergents particularly desirable for specific uses may be formed as follows:

|  | Parts by weight |
|---|---|
| $SiO_2$ | from 40 to 45 |
| $Na_2O$ | from 45 to 50 |
| $P_2O_5$ | from 5 to 15 |

A very practical detergent has been formed as follows:

|  | Per cent |
|---|---|
| $SiO_2$ | 45 |
| $Na_2O$ | 45 |
| $P_2O_5$ | 10 |

This addition of 10% $P_2O_5$ to such a high alkali silicate has been found to produce a protective action on the refractories during melting and makes practical the direct melting of silicates with higher alkali contents than has been possible commercially as far as is known. The resulting glasses are characterized by being less hygroscopic than the known alkali silicate glasses at these high $Na_2O$ levels and this factor will be valuable in the storage, packaging and transportation of the product.

As an example of glasses relatively high in $P_2O_5$ and containing appreciable amounts of silica, which have detergent properties, especially in preventing the redeposition of soil on fabrics, an example would be a composition of

|  | Parts by weight |
|---|---|
| $SiO_2$ | from 10 to 15 |
| $Na_2O$ | from 35 to 40 |
| $P_2O_5$ | from 50 to 55 |

As a further example of the advantages of this process, it has been found that whereas it has been commercially impractical to produce sodium phosphate glasses higher in $P_2O_5$ than 70%, it is possible, by adding silica in amounts of from 10 to 15%, to produce glasses which will contain 75 to 85% $P_2O_5$. Such glasses can be produced with reasonable amount of attack on the refractory normally used in furnace construction. The highest $P_2O_5$ content glass that has been produced commercially is 70% $P_2O_5$ and 30% $Na_2O$. The finding here is that we can have a higher percentage of $P_2O_5$ than has heretofore been commercially practical. From the standpoint of practical manufacture this is of interest. The above examples all give homogeneous glasses which are completely soluble.

The factors controlling the detergent efficiencies are:

1. The deflocculation of the soil or the suspending of the particles which are removed from cloth, metal or whatever is being washed.
2. Wetting, which is related to surface tension.
3. Emulsification; alkali is a principal emulsifier of oils and greases. Soap is soluble in water where grease is not.
4. The phosphates are particularly valuable in preventing the formation of lime and magnesium soaps and also in preventing the precipitation of calcium and magnesium silicates when working with a detergent containing silicate.

The compositions of the present invention are notable in contributing to all four of the above factors, being in themselves, detergents of all around value.

A composition particularly suitable for use as an abrasive scouring powder or as the main constituent of an abrasive scouring powder compound may be formed within the range of:

|  | Parts by weight |
|---|---|
| $SiO_2$ | 25 to 80 |
| $P_2O_5$ | 1 to 50 |
| $Na_2O$ | 20 to 40 |

Narrower limits of the above parts by weight may be desirable as it has been found that by proper selection and combination of ingredients and heat treatment the scouring properties of the material will be varied.

For relatively soft material, such as aluminum, it might be desirable to have a glass of lower hardness or to have the crystals precipitated within the glassy matrix of a lower hardness than the aluminum so that it can not scratch the aluminum.

For a hard material like porcelain the hardness and abrasiveness of the material can be relatively high. This can be varied by controlling the hardness of the slowly soluble portion of the glass or of the finely divided crystals. The controlling factors are the proportions of $Na_2O$, $P_2O_5$ and $SiO_2$ and the heat treatment to which the product of fusion is subjected. The higher the $SiO_2$ the higher the abrasiveness; the higher the $Na_2O$ the lower the abrasiveness. The heat treatment is controlled as follows: By rapid cooling all of the constituents can be retained in a fused unitary vitreous condition; by slowly cooling crystalline material of a hardness desirable for the particular intended use can be precipitated in the glassy matrix. For example, for a calculated composition of

| | Parts by weight |
|---|---|
| $SiO_2$ | 71 |
| $Na_2O$ | 24 |
| $P_2O_5$ | 5 | the resultant glass was found to have a Knoop-Peters penetration modulus of 338 kg.-mm.² This is a recognized and standard hardness test evolved at the United States Bureau of Standards involving indentation of the article to be measured with a diamond of exactly specified dimensions. As another example, a glass of the composition

| | Parts by weight |
|---|---|
| $SiO_2$ | 50 |
| $Na_2O$ | 45 |
| $P_2O_5$ | 5 | has a modulus of 226 kg.-mm.²

Glass of the composition

| | Parts by weight |
|---|---|
| $SiO_2$ | 50 |
| $Na_2O$ | 40 |
| $P_2O_5$ | 10 | has the abnormally low value of 157 kg.-mm.²

From the above, it is apparent that as the sodium oxide ($Na_2O$) is increased, particularly at the expense of $SiO_2$, the resultant glass has much softer characteristics. In this manner, therefore, the hardness of the glass may be controlled. Values are available for commercial glasses and porcelains of various compositions and most of the metals of commerce so that by consulting these known values and comparing with the penetration moduli of these glassy scouring agents, it will be possible to select a composition for the glass which will be softer than the material to be cleaned so that a composition particularly adaptable for cleansing such articles can be formed.

The particular characteristics of the basic compositions set forth herein which render it possible to obtain a desirable abrasive powder are as follows:

1. A homogeneous glass is obtainable which is so slowly soluble that in the process of using it some undissolved glass is present before the whole composition goes into solution.
2. The possibility of slowly cooling the melts so that insoluble compounds will be left as a residual abrasive after all the soluble glass has gone into solution.

By rapid cooling, certain advantages can be obtained; for example, a more soluble glass, one more efficient in its detergent action and water softening and finally one that will be less abrasive if this should be desirable. If it is desired to obtain more crystalline structure the glass can be maintained at a temperature in the annealing range or slightly above it where crystals will slowly deposit and by controlling the time and temperature for this further heat treatment the number and size of these crystals can be controlled to any desirable level. For example, if it is desirable to obtain a composition which will readily pulverize into substantially uniform powder this can be obtained by the use of a composition substantially as follows:

| | Per cent |
|---|---|
| $SiO_2$ | 35 |
| $Na_2O$ | 35 |
| $P_2O_5$ | 30 |

The molten product is cooled slowly enough so that finely divided crystals form throughout the mass. The resultant product at room temperature is in a condition which permits pulverizing with a minimum of effort. In addition, if a composition, such as described, is tempered at a temperature of 400 to 550° C. for a period of 10 to 20 hours, a spontaneous transformation may result which will produce a powdery product thereby not requiring subsequent pulverization. The resultant product will be a powdery composition with the particles substantially uniform.

One of the difficulties with most known prior art abrasive compounds is that during shipping there is a tendency for the heavier particles to settle with the lighter portions of the composition tending to rise to the surface of the composition. This is decidedly detrimental in obtaining the most practical results during the actual use of the composition. With most prior art abrasive compositions, therefore, it is of necessity, prior to actual use, to thoroughly mix the composition. This, of course, is not generally known and has been one of the major difficulties encountered with known prior art abrasive compositions. This difficulty is completely overcome by the present invention as there is no tendency of any settling since the present invention is directed to a homogeneous product of fusion. If desirable, however, the composition of the present invention may be compounded with soaps, wetting agents, alkali salts, etc. The advantage of such mixtures would be that the known commercial soaps, wetting agents, alkali salts, etc. would perform more efficiently. Even when such additions are made the composition of the present invention still would be 90% or more of the total weight of the compound. Although homogeneous transparent glasses may be obtained within the limits set forth herein, it has been found that compositions embodying crystals in a glassy matrix may be obtained. An example of such composition is as follows:

| | Parts by weight |
|---|---|
| $SiO_2$ | 40 to 80 |
| $P_2O_5$ | 1 to 50 |
| $Na_2O$ | 20 to 40 |

A particular composition which I have found to possess desirable characteristics in this respect has the calculated composition of

| | Per cent |
|---|---|
| $SiO_2$ | 55 |
| $Na_2O$ | 30 |
| $P_2O_5$ | 15 |

In the parent application of which this application is a continuation in part a limited field designed as X, Y and Z has been given. The compositions taken within this designated field are melted by a suitable application of heat within a controlled temperature range between 1800° and 2800° F. for a sufficient time to obtain a homogeneous liquid.

It is to be understood, however, that there are specific proportions of mixtures and temperatures within these limits and the broader limits now disclosed which produce more desirable results.

This could be arrived at by preparing a composition and testing it for its value as a cleansing agent, water softener, etc. It will be noted that in the X, Y, Z field the ingredients which are comparatively expensive are maintained at a minimum as compared with the inexpensive ingredients of the mix. This result has been made possible by working within the limits of the X, Y, Z field illustrated in the drawing. Up to the teachings of the present invention, it has previously been considered that phosphate additions would immediately destroy vitrification in sodium silicate glasses by separation of crystals or of a second immiscible liquid. It has been found, however, that by careful control of the proportions of the ultimate constituent oxides and of the time-temperature cycle of melting and cooling as disclosed herein it is possible to dissolve as much as 12% or higher $P_2O_5$ by weight in sodium silicate glasses and still obtain homogeneous melts with excellent melting and solution characteristics and highly desirable cleansing action and water softening effects.

The above disclosure is directed particularly to the obtaining of an inexpensive and desirable mixture. It is to be understood, however, that if the element of expense is disregarded that other practical mixtures might be formed through the use of different proportions of said ingredients, more particularly at the high $P_2O_5$ corner of the triangle in the chart illustrated in the drawing. It has been discovered that as much as 23% by weight of silica can be dissolved in certain sodium phosphate glass forming melts, if the $P_2O_5$ is maintained above 70% by weight, without destroying the homogeneity of the melt and product. Such products have been found to possess more desirable advantages than those obtained with the prior art pure sodium phosphate glasses. Such products have been found to possess advantages over the prior art for uses where pure sodium phosphate glasses have been applied because of their water softening properties.

Increasing $Na_2O$ will increase the solubility and the substitution of $K_2O$ for $Na_2O$ will also increase it. Addition of $P_2O_5$ to high silica ratio, sodium silicate glasses with a compensating increase in $Na_2O$ makes possible a high silica ratio glass with a much higher solubility than would have been expected. It is well known that these high silica glasses are slow to dissolve and $P_2O_5$ added with enough alkali to satisfy its acidity leaves a homogeneous detergent or water softening agent similar to the high silica glasses but of much greater solubility.

It is to be understood that the ingredients set forth herein are given only by way of illustration as to how a practical mixture could be formed but it is to be understood that other known ingredients possessing characteristics similar to the respective ingredients disclosed herein might be used, for example, other alkali metal oxides such as lithium or potassium or mixtures thereof may be used instead of sodium. For example, a desirable mixture could be formed by mixing 62% of sand ($SiO_2$) 33% of potassium oxide ($K_2O$), obtained from that amount of potash ($K_2CO_3$), which will leave that much $K_2O$ in the ultimate glass, and 5% of $P_2O_5$ which can be derived from some form of phosphoric acid or ammonium phosphate which will leave that amount of $P_2O_5$ in the glass. The desired amount of $P_2O_5$ may also be obtained from a potassium phosphate and the balance of $K_2O$ required may be derived from potash but such procedures are more expensive than when soda ash or phosphoric acids are used as raw materials.

It has been found that practical and usable mixtures may be formed by combining ingredients in the proportions set forth in the X, Y, Z area in the chart. It will be noted that in this chart the silica may be varied from 50 to 80%, the sodium oxide from 20 to 50% and the amount of $P_2O_5$ which can be dissolved depends upon the proportions of soda and silica, and will vary from a fraction of one percent to 12% at the maximum. In all instances where it is desirable to produce transparent inexpensive glasses, it is desirable to keep the $P_2O_5$ as low as possible and still obtain a product which will produce the desired characteristics, which characteristics are that the resultant mixture will produce the desirable cleansing and water softening and hydrogen ion control. The process, therefore, is to combine the desired proportions of ingredients and to thoroughly mix the said ingredients and to thereafter place the said ingredients in a suitable tank or pot furnace and to heat the mixture to a controlled temperature depending upon proportions of ingredients used, the temperature being controlled so as to avoid the precipitation of crystals in the melt and in all instances such that the heated ingredients will be rendered fluid and then be completely soluble in water on quenching.

It is to be understood that the heating is for a minimum duration feasible to produce the melt desired.

It has been found that although usable compositions may be obtained within the designated field X, Y, and Z that where expense of composition is to be disregarded, a much higher $P_2O_5$ content may be used. For example, a composition suitable for use as a water softening agent may be obtained within the range of 10 to 80 parts by weight $SiO_2$, 1 to 85 parts by weight $P_2O_5$ and 20 to 70 parts by weight of $Na_2O$.

The most desirable results for specific uses may be obtained within the above limits by trial and error. For example, a composition containing

| | Percent |
|---|---|
| $SiO_2$ | 62 |
| $Na_2O$ | 33 |
| $P_2O_5$ | 5 | is rapidly soluble in boiling water with approximately 95% dissolving at the end of 15 minutes.

As a further useful part of the present invention, it is possible to form ternary compositions suitable for use in water treatment, particularly when it is desirable to control corrosion of metal in pipes, tanks, boilers, heating units, condenser coils, etc. through which the water is flowed. These compositions may be used to prevent corrosion and deposition of scale by forming glass into blocks of desirable sizes and rates of solution and then placing the blocks in the path of the main source of supply of water or by placing the blocks in a suitable by-pass in the supply line. Sodium silicates and sodium phosphates will be slowly dissolved from the blocks at a rate which will give the desired protection for the metals and the prevention of scale and will also give the optimum ratio of $P_2O_5$ and $SiO_2$.

If it is desirable to increase the amount of $P_2O_5$ going into solution, glass compositions having a higher phosphate content are used and if it is desired to have an increased amount of $SiO_2$ in solution, the $SiO_2$ content of the glass is increased relative to that of the $P_2O_5$. By proper balance the most desirable proportions may be obtained. The sodium phosphates prevent the scale formation and the silicates are more economical and more effective in preventing corrosion.

It is known that pure sodium phosphate glasses have been used as water treatment means but the glasses of the present invention are ternary, releasing three oxides and compounds thereof into the water in controlled proportions at a controlled rate of solution, which rate is much slower than that of the sodium phosphates previously known. This greatly increases the life of the blocks and obviates constant replacement. By selecting the proper ratios of $P_2O_5$, $Na_2O$ and $SiO_2$ these products can be used to control the hydrogen ion concentration of water.

It has also been found that compositions within the range which have been described are deflocculants for solid materials and may be used in such applications as the drilling of oil wells, purification of clay and flotation of minerals.

When combining the three major ingredients of the invention with a view to obtaining the desired results in an efficient manner, it has been found that care has to be exercised in controlling the limits of the proportions of the various ingredients used. If the proportions of the ingredients are carried within the areas which have been cross-hatched in the drawing difficulty from the viewpoint of fabrication is introduced. Although it might be possible to obtain usable products by carrying the proportions of the ingredients within the cross-hatched areas the present invention, however, is directed to utilizing, what has been found, up to the present time, to be the most commercially practical limits.

Although I have set up relatively broad limits in which desirable compositions have been obtained as far as the functions of said compositions are concerned, it has been found that from a commercial aspect that limits of the following scope might be more desirable:

| | Parts by weight |
|---|---|
| $P_2O_5$ | 2 to 70 |
| $Na_2O$ | 15 to 65 |
| $SiO_2$ | 10 to 70 |

Sodium phosphates are effective at such low concentrations that the objectives of the present invention are attained even when $P_2O_5$ is present in very low percentages in ternary product.

In a three-component composition such as disclosed herein, enough of each of the constituents must be present to give the properties desired and it is particularly desirable that the silica content be controlled so that in no instance it is much less than 10% by weight of the product. It is to be understood, however, that the carrying of the proportions slightly within the restricted areas are intended to be within the scope of the invention.

It has been found that the compositions do not melt to a liquid within reasonable practical temperatures when the $Na_2O$ content is below 20% and the $P_2O_5$ is less than 55%. Where $Na_2O$ is more than 70% the melts show a tendency to be corrosive on ordinary ceramic refractories and do not form true glasses. Where $P_2O_5$ is above 85% the melts fume continuously, are corrosive and are difficult to fabricate. Where $SiO_2$ content is less than approximately 10% the glasses are not particularly desirable for the uses sought by the present invention.

As a source of $SiO_2$ any good grade of glass sand can be used. In some cases, it may be advantageous to have this sand more finely pulverized than is common practice in the glass industry to facilitate rapid solution in the melt. It is also possible to use commercially available sodium silicate glasses. As a source of $Na_2O$ there may be used soda ash, commercially available silicate glasses or sodium silicate salts, or commercially available sodium phosphate glasses or salts. As a source of $P_2O_5$ there can be used $P_2O_5$ itself, phosphoric acids, ammonium phosphates, sodium phosphate compositions either in the glassy or crystalline forms, or any other easily available form of $P_2O_5$.

Batches made up of ingredients calculated to give an end product of a desired composition are mixed either in the wet or dry way, then fed into a refractory container or reverbatory furnace at the most suitable temperature for conducting melting operations. The resultant melt is held at a temperature above the fusion point, but not too high so that excessive refractory attack and volatilization does not take place, until the reactions have been substantially completed.

The melt can then be taken from the furnace either by pouring into water or other non-inflammable liquid quenching medium or dropping onto a chilled metal plate or flowing between chilled rolls for relatively quick quenching or it may be formed into blocks as above described, and then later may be transported through an annealing chamber for the controlled cooling and conditioning described above. In some instances, when it is desired to reduce the composition to a powdery state the chilled or otherwise formed product may be subjected to a pulverizing and sizing treatment.

From the foregoing description it will be seen that simple, efficient and economical means and method are provided for accomplishing all of the objects and advantages of the invention.

Having described my invention, I claim:

1. A fused unitary vitreous composition which is soluble to a marked extent in water and is adapted to act as a cleaning agent and as a water softening agent, said fused unitary vitreous composition consisting of silica within the range of 50 to 80% by weight, sodium oxide within the range of 20 to 50% by weight and phosphorous pentoxide from a fraction of 1 to 12% by weight.

2. The process of forming a unitary vitreous composition, which is soluble to a marked extent in water and is adapted to act as a cleaning agent and as a water softener agent, comprising forming a mixture consisting of silica within the range of 50 to 80% by weight, sodium carbonate of an amount sufficient to yield 20 to 50% by weight of sodium oxide, and an ingredient resulting in phosphorous pentoxide of from a fraction of 1 to 12% by weight, fusing said mixture and so controlling the temperature of fusion within some narrow range between 1800° F. and 2800° F. according to the particular batch being melted so as to produce a unitary vitreous composition.

3. A composition for use as a detergent, a water treating agent, an abrasive scouring agent and a deflocculant comprising the product of fusion of ingredients yielding $SiO_2$ from 10 to 80 parts by weight, $P_2O_5$ from a fraction of 1 to 20 parts by weight, and an alkali metal oxide of from 20 to 70 parts by weight.

4. A fused unitary vitreous composition comprising the product of fusion of ingredients yielding $SiO_2$ from 40 to 45 parts by weight, $Na_2O$ from 45 to 50 parts by weight and $P_2O_5$ from 5 to 15 parts by weight.

5. A fused unitary vitreous composition for use as a detergent, a water treating agent, an abrasive scouring agent and a deflocculant comprising the product of fusion of ingredients yielding 45% $SiO_2$, 45% $Na_2O$ and 10% $P_2O_5$.

6. A fused unitary vitreous composition for use as a detergent, a water treating agent, an abrasive scouring agent and a deflocculant comprising the product of fusion of ingredients yielding $SiO_2$ from 25 to 80 parts by weight, $Na_2O$ from 20 to 40 parts by weight and $P_2O_5$ from 1 to 50 parts by weight.

7. A fused unitary vitreous composition for use as a detergent, a water treating agent, an abrasive scouring agent and a deflocculant comprising the product of fusion of ingredients yielding $SiO_2$ from 40 to 80 parts by weight, $P_2O_5$ from 1 to 50 parts by weight and $Na_2O$ from 20 to 40 parts by weight.

8. The process of producing a composition for use as a detergent, a water treating agent and a deflocculant comprising subjecting mixtures of ingredients which will yield silica, alkali metal oxide and phosphorous pentoxide to a controlled temperature within the range of 1800° F. and 2800° F., with said temperature being sufficient to fuse said ingredients into a liquid and relatively rapidly chilling said liquid so as to retain it in a unitary homogeneous glassy structure, with the silica content being no less than 10 and no greater than 80 parts by weight, the phosphorous pentoxide content being no less than 1 and no greater than 20 parts by weight and the alkali metal oxide content being no less than 20 and no greater than 70 parts by weight.

9. A fused unitary vitreous composition which is soluble to a marked extent in water and is adapted to act as a cleansing agent and as a water softening agent, said fused unitary vitreous composition consisting of silica within the range of 50 to 80 parts by weight, alkali metal oxides within the range of 20 to 50 parts by weight and phosphorous pentoxide from a fraction of 1 to 12 parts by weight.

10. The process of producing a fused unitary vitreous composition comprising fusing together a mixture of ingredients yielding silica from 25 to 80 parts by weight, alkali metal oxide from 20 to 40 parts by weight and phosphorous pentoxide from 1 to 50 parts by weight with the temperature of fusion being within the range of 1800° F. and 2800° F. and thereafter cooling said resultant product to room temperature to obtain a structure embodying crystals supported by a glassy matrix.

11. A fused unitary vitreous composition such as claimed in claim 1 wherein lithium oxide is substituted for sodium oxide.

12. A fused unitary vitreous composition such as claimed in claim 1 wherein potassium oxide is substituted for sodium oxide.

ALEXIS G. PINCUS.

REFERENCES CITED

The following references are of record in the file of this patent:

UNITED STATES PATENTS

| Number | Name | Date |
|---|---|---|
| 1,968,752 | Evans | July 31, 1934 |
| 1,968,753 | Evans | July 31, 1934 |
| 1,774,872 | Cowles | Sept. 2, 1930 |
| 2,175,781 | Riggs et al. | Oct. 10, 1939 |
| 1,855,776 | Speer | Apr. 26, 1932 |
| 2,315,995 | Williams | Apr. 6, 1943 |
| 2,100,944 | Davies | Nov. 30, 1937 |
| 2,304,850 | Rice | Dec. 15, 1942 |